United States Patent
Steck (10) Patent No.: US 9,092,739 B2
(45) Date of Patent: Jul. 28, 2015

(54) RECOMMENDER SYSTEM WITH TRAINING FUNCTION BASED ON NON-RANDOM MISSING DATA

(75) Inventor: Harald Steck, New Providence, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 537 days.

(21) Appl. No.: 12/841,720

(22) Filed: Jul. 22, 2010

(65) Prior Publication Data

US 2012/0023045 A1    Jan. 26, 2012

(51) Int. Cl.
  G06N 3/08    (2006.01)
  G06F 15/18   (2006.01)
  G06N 99/00   (2010.01)

(52) U.S. Cl.
  CPC .................................. G06N 99/005 (2013.01)

(58) Field of Classification Search
  None
  See application file for complete search history.

(56) References Cited

U.S. PATENT DOCUMENTS

2006/0136462 A1* 6/2006 Campos et al. ............... 707/102
2007/0094180 A1* 4/2007 Rifkin et al. .................... 706/20
2011/0276565 A1* 11/2011 Zheng et al. ................... 707/724

OTHER PUBLICATIONS

Salakhutdinov and Mnih, "Probabilistic Matric Factorization", Advances in Neural Information Processing Systems, vol. 20 (NIPS 2007), 2007, pp. 1-8.*
Guo, Liu, Wang, "Efficient Multiple-Click Models in Web Search", Proceeding WSDM '09 Proceedings of the Second ACM International Conference on Web Search and Data Mining, Feb. 2009, pp. 124-131.*
Salakhutdinov and Mnih, "Probabilistic Matrix Factorization", Advances in Neural Information Processing Systems, vol. 20(NIPS 2007), 2007, pp. 1-8.*
Ma, Yang, Lyu, King, "SoRec: social recommendation using probabilistic matrix factorization", Proceeding CIKM '08 Proceedings of the 17th ACM conference on Information and knowledge management, 2008, pp. 931-940.*
Koren, Bell, Volinsky, "Matrix Factorization Techniques for Recommender Systems", Computer (vol. 42, Issue: 8), Aug. 2009, pp. 30-37.*
Lukas Meier, Sara van de Geer and Peter Bühlmann, "The group lasso for logistic regression", J. R. Statist. Soc. B, vol. 70, part 1, 2008. pp. 53-71.*
Yifan Hu, Yehuda Koren, Chris Volinsky, "Collaborative Filtering for Implicit Feedback Datasets", Data Mining, 2008. ICDM '08. Eighth IEEE International Conference on, Dec. 19, 2008, pp. 263-272.*
Benjamin M. Marlin, "Missing Data Problems in Machine Learning" phD Theisis published by Graduate Department of Computer Science, University of Toronto, 2008, pp. 1-156.*

(Continued)

*Primary Examiner* — Kakali Chaki
*Assistant Examiner* — Walter Hanchak
(74) *Attorney, Agent, or Firm* — Ryan, Mason & Lewis, LLP (57) ABSTRACT

A processing device of an information processing system is operative to obtain observed feedback data, to construct a model that accounts for both the observed feedback data and additional feedback data that is missing from the observed feedback data, to optimize one or more parameters of the model using a training objective function, and to generate a list of recommended items for a given user based on the optimized model. In illustrative embodiments, the missing feedback data comprises data that is missing not at random (MNAR), and the model comprises a matrix factorization model. The processing device may implement a recommender system comprising a training module coupled to a recommendation module.

24 Claims, 2 Drawing Sheets

(56) References Cited

OTHER PUBLICATIONS

D.J. Hand et al., "A Simple Generalisation of the Area Under the ROC Curve for Multiple Class Classification Problems," Machine Learning, Nov. 2001, pp. 171-186, vol. 45, No. 2.

Y. Hu et al., "Collaborative Filtering for Implicit Feedback Datasets," IEEE, 8th International Conference on Data Mining, Dec. 2008, pp. 263-272.

R.H. Keshavan et al., "Matrix Completion from Noisy Entries," http://arxiv.org/pdf/0906.2027, Jun. 2009, 15 pages.

Yehuda Koren, "Factorization Meets the Neighborhood: A Multifaceted Collaborative Filtering Model," 14th ACM SIGKDD International Conference on Knowledge Discovery and Data Mining, Aug. 2008, pp. 426-434.

B.M. Marlin et al., "Collaborative Prediction and Ranking with Non-Random Missing Data," 3rd ACM Conference on Recommender Systems, Oct. 2009, pp. 5-12.

B.M. Marlin et al., "Collaborative Filtering and the Missing at Random Assumption," 23rd Conference on Uncertainty in Artificial Intelligence, 2007, pp. 50-54, vol. 47.

Donald B. Rubin, "Inference and Missing Data," Biometrika, Dec. 1976, pp. 581-592, vol. 63, No. 3.

R. Salakhutdinov et al., "Restricted Boltzmann Machines for Collaborative Filtering," 24th International Conference on Machine Learning, Jun. 2007, pp. 791-798, vol. 227.

N. Srebro et al., "Weighted Low-Rank Approximations," 20th International Conference on Machine Learning, Aug. 2003, pp. 720-727.

Harald Steck, "Hinge Rank Loss and the Area Under the ROC Curve," Lecture Notes in Computer Science, 18th European Conference on Machine Learning, Sep. 2007, pp. 347-358, vol. 4701, Warsaw, Poland.

M. Weimer et al., "CoFi Rank—Maximum Margin Matrix Factorization for Collaborative Ranking," 21st Annual Conference on Neural Information Processing Systems, Dec. 2007, pp. 1593-1600, vol. 20, Vancouver, British Columbia, Canada.

S. Wu et al., "A Scored AUC Metric for Classifier Evaluation and Selection," ROC Analysis in Machine Learning at International Conference on Machine Learning, 2005, 6 pages, Bonn, Germany.

J. Bennett et al., "The Netflix Prize," KDD Cup and Workshop, Aug. 2007, 4 pages.

\* cited by examiner

RECOMMENDER SYSTEM WITH TRAINING FUNCTION BASED ON NON-RANDOM MISSING DATA

FIELD OF THE INVENTION

The present invention relates generally to the field of information processing, and more particularly relates to techniques for generating recommendations in an information processing system.

BACKGROUND OF THE INVENTION

Recommender systems are commonly implemented in web-based electronic commerce applications such as online stores, catalogs, movie rentals, etc. The basic function of a recommender system is to automatically suggest items to each user that he or she may find appealing. The quality of recommender systems can be assessed with respect to various criteria, including accuracy, diversity, surprise or serendipity, and explainability of recommendations. By way of example, the accuracy of the recommendations generated by a recommender system may be measured using root mean squared error (RMSE). Thus, recommender systems can be trained and tested using an objective function that is based on the RMSE of the recommendations. Such an approach has the advantage of computational efficiency, but is generally based on observed feedback data only, such as actual ratings assigned by users to selectable items.

As a result, these and other similar approaches, which may alternatively involve optimization of mean absolute error (MAE) or a ranking measure, are based on an assumption that any missing ratings are missing at random. In the context of recommender systems, this assumption means that the likelihood that any particular rating is missing is entirely independent of the actual value of that rating. Recommender systems that adopt this assumption are configured simply to ignore the missing ratings. Unfortunately, missing ratings in many practical applications may not actually be missing at random. See, for example, B. Marlin et al., "Collaborative prediction and ranking with non-random missing data," ACM Conference on Recommender Systems (RecSys), 2009, and B. Marlin et al., "Collaborative filtering and the missing at random assumption," Conf. on Uncertainty in Artificial Intelligence (UAI), 2007. Recommender systems based on the missing at random assumption are therefore limited in terms of the level of performance they can achieve.

Accordingly, what is needed is a recommender system that takes both observed and missing feedback data into account while exhibiting a computational efficiency comparable to that of systems that simply ignore missing feedback data.

SUMMARY OF THE INVENTION

Illustrative embodiments of the present invention provide improved recommender systems by implementing training which takes into account missing data where the missing data is not missing at random.

In accordance with one aspect of the invention, a processing device of an information processing system is operative to obtain observed feedback data, to construct a model that accounts for both the observed feedback data and additional feedback data that is missing from the observed feedback data, to optimize one or more parameters of the model using a training objective function, and to generate a list of recommended items for a given user based on the optimized model. In one or more of the illustrative embodiments, the missing feedback data comprises data that is missing not at random (MNAR), and the model comprises a matrix factorization model.

In accordance with another aspect of the invention, a recommender system comprises a training module and a recommendation module coupled to the training module. The training module is configured to apply a training objective function to optimize one or more parameters of a model that accounts for both observed feedback data and additional feedback data that is missing from the observed feedback data. The recommendation module generates a list of recommended items for a given user based on the optimized model.

The illustrative embodiments can provide significant advantages over conventional approaches. For example, certain of these embodiments when applied to a particular publicly-available data set provide approximately 40-50% higher top-k hit rates (depending on the chosen value for k), than conventional approaches that simply ignore missing ratings. This significantly improved performance in terms of higher top-k hit rates can translate to higher sales of selectable items in electronic commerce and other applications.

These and other features and advantages of the present invention will become more apparent from the accompanying drawings and the following detailed description.

DETAILED DESCRIPTION OF THE INVENTION

The present invention will be illustrated herein in conjunction with exemplary information processing systems, processing devices and recommender techniques. It should be understood, however, that the invention is not limited to use with the particular types of systems, devices and techniques disclosed. For example, aspects of the present invention can be implemented in a wide variety of other information processing system configurations, using processing devices and process steps other than those described in conjunction with the illustrative embodiments.

Figure 1:
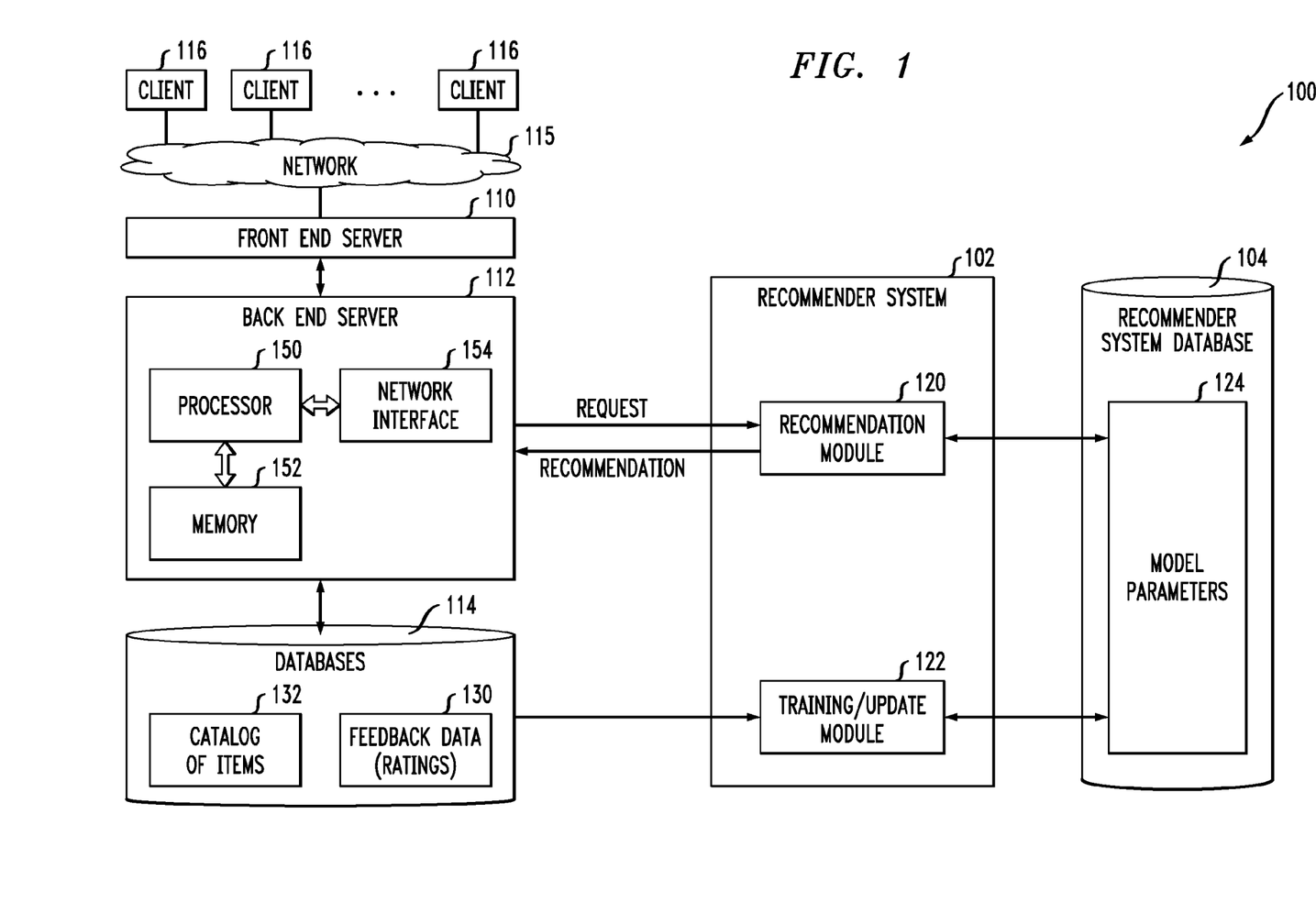
FIG. 1 is a block diagram of an information processing system implementing a recommender system trained with non-random missing data in an illustrative embodiment of the invention.

FIG. 1 shows an information processing system 100 comprising a recommender system 102 and an associated recommender system database 104. The system also includes a front end server 110, a back end server 112, and a set of databases 114. The front end server is coupled via a network 115 to a plurality of client devices 116 as shown.

Although the recommender system 102 and its associated database 104 are shown in the present figure as being separate from the front end server 110 and the back end server 112, this is for simplicity and clarity of illustration only. For example, the recommender system 102 and its associated database 104 may be implemented in whole or in part on the back end server 112, on the front end server 110, or on another separate server or other processing platform. Thus, the recommender system 102 in a given embodiment may be implemented entirely within the backend server 112, or in a distributed manner across multiple servers, computers or other types of processing devices.

The recommender system 102 includes a recommendation module 120 and a training/update module 122. The recommendation module 120 processes requests from the back end server 112 and responsive to those requests delivers corresponding recommendations to the back end server. The requests from the back end server 112 to the recommender system 102 may be based on inquiries received from the client devices 116 via the network 115 and front end server 110. The back end server 112 provides the recommendations generated by the recommender system 102 to client devices 116 via the network 115 and front end server 110. The training/update module 122 is operative to control one or more model parameters 124 that are stored in the recommender system database 104 and utilized by the recommendation module 120 in generating its recommendations.

The training/update module 122 obtains observed feedback data 130 from databases 114, identifies additional feedback data that is missing from the observed feedback data, and constructs a model that accounts for both the observed feedback data and the missing feedback data. The observed feedback data may comprise, for example, ratings assigned by users to selectable items from a catalog of items 132 in databases 114. The missing feedback data in the present embodiment comprises data that is missing not at random (MNAR). The model may comprise, for example, a matrix factorization model, which may be characterized as a neural network. As will be described in greater detail below, parameters of the model are optimized so as to maximize a number of relevant items that are recommended by the recommendation module 120 to a given user. It is to be appreciated, however, that terms such as "optimize" and "optimization" as used herein should not be construed as requiring the achievement of an absolute maximum or minimum value.

The client devices 116 may each comprise at least a portion of a computer or any other type of processing device suitable for communicating with front end server 110 over network 115. For example, one or more of the client devices may comprise a portable or laptop computer, mobile telephone, personal digital assistant (PDA), wireless email device, television set-top box (STB), or other communication device.

The network 115 may comprise a wide area network such as the Internet, a metropolitan area network, a local area network, a cable network, a telephone network, a satellite network, as well as portions or combinations of these or other networks. Although not explicitly shown in the figure, similar portions or combinations of one or more networks may be used to interconnect other system elements, such as the servers 110 and 112, the recommender system 102, and the databases 104 and 114.

As illustrated in FIG. 1, the back end server 112 comprises a processor 150 coupled to a memory 152, and further comprises network interface circuitry 154. The processor 150 may be implemented as a microprocessor, a microcontroller, an application-specific integrated circuit (ASIC) or other type of processing device, as well as portions or combinations of such devices. The memory 152 may comprise an electronic random access memory (RAM), a read-only memory (ROM), a disk-based memory, or other type of storage device, as well as portions or combinations of such devices.

Assuming for purposes of illustration that the recommender system 102 runs at least in part on back end server 112, the processor 150 and memory 152 may be used in storage and execution of one or more software programs for implementing functionality associated with that system, such as processing requests, generating recommendations, training and updating a model, and performing other related operations. The modules 120 and 122 may therefore be implemented at least in part using software programs. The memory 202 may be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 150, memory 152 and interface circuitry 154 may comprise well-known conventional circuitry suitably modified to operate in the manner described herein. Also, the various modules shown in FIG. 1 may be viewed as examples of circuitry used to implement the associated functionality. For example, portions of such circuitry may comprise matrix multiplication circuitry or other types of arithmetic logic circuitry. Conventional aspects of such circuitry are well known to those skilled in the art and therefore will not be described in detail herein.

It is to be appreciated that an information processing system as disclosed herein may be implemented using devices, components and modules other than those specifically shown in the exemplary arrangement of FIG. 1.

Figure 2:
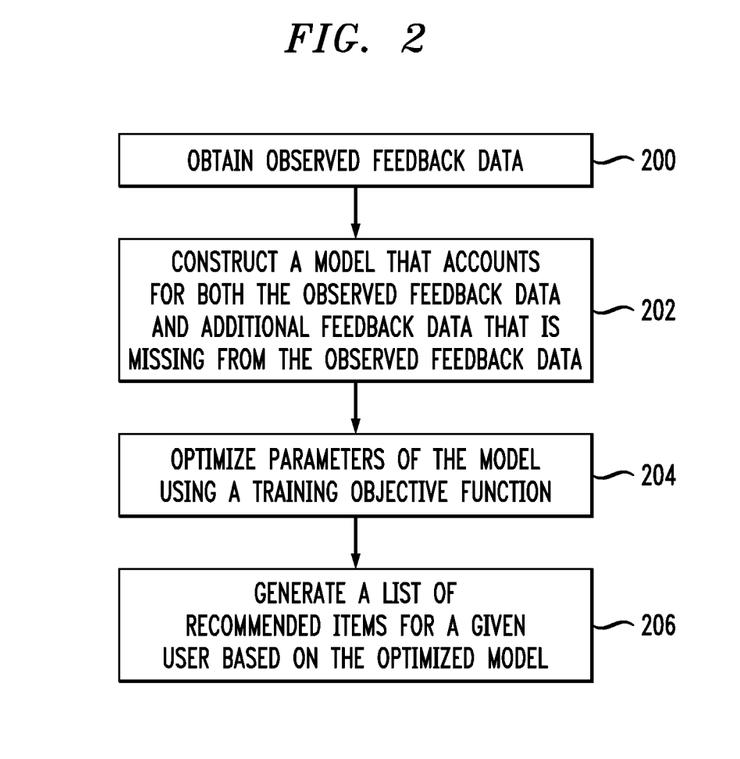
FIG. 2 is a flow diagram of a process that is implemented in the recommender system of FIG. 1 in an illustrative embodiment of the invention.

FIG. 2 shows an exemplary process that is implemented in the recommender system 102 of FIG. 1. In this embodiment, the process includes steps 200 through 206. In step 200, observed feedback data is obtained in training/update module 122 from feedback data 130 of databases 114. The recommender system 102 constructs a model that accounts for both the observed feedback data and additional feedback data that is missing from the observed feedback data, as indicated in step 202. The term "constructs" in this context is intended to be interpreted broadly, so as to encompass, for example, arrangements in which the recommender system retrieves portions of a model or other associated information from a memory and initializes one or more model parameters. Parameters of the model are then optimized in step 204, using a training objective function. Details of suitable models and training objective functions for use in this embodiment will be provided elsewhere herein. In step 206, the recommendation module 120 of recommender system 102 utilizes the optimized model to generate a list of recommended items for a given user. As indicated previously, such lists may be provided to client devices 116 via network 115 and the server 110 and 112.

It should be noted that the particular process steps and their ordering as shown in FIG. 2 are presented by way of illustrative example only, and alternative embodiments may use other arrangements of process steps.

The operation of the system 100 in illustrative embodiments will now be described in greater detail. More specifically, in these embodiments, the recommender system 102 is configured to provide considerably improved top-k hit rates relative to conventional recommender systems that are trained using observed ratings only. This means that, among the k items recommended to a given user, the number of items that can be expected to appeal to that user is considerably increased. In the illustrative embodiments, the improved top-k hit rates are achieved in part through the use of objective functions that take into account data missing not at random (MNAR) and yet exhibit computational efficiency.

It should be noted that the embodiments to be described are based on user ratings, but other types of feedback data may be used in other embodiments.

The top-k hit rate is a natural performance measure for recommender systems in practice, as only a small number of items can be recommended to a user. Ideally, each of the recommended items is relevant to a user. We consider an item relevant to a user if he or she finds this item appealing or interesting. Of course, different items may be relevant to different users. In our notation below, a quantity with the superscript "+" refers to relevant items. In order to make this general definition more concrete, with reference to the data in our experiments described elsewhere herein, we consider items with a highest (e.g., 5 star) rating as relevant to a user. In case of continuous-valued ratings, one may regard the values above an appropriate threshold (possibly different for each user) as relevant.

We initially assume that complete data are available, i.e., the ratings of all items by all users. This allows us to define the performance measures we ideally would like to compute. For a chosen cut-off value k'∈N, the top-k hit rate may be defined in two in terms of precision as $N_u^{+,k'}/k'$, or in terms of recall as $N_u^{+,k'}/N_u^+$. In these definitions, $N_u^{+,k'}$ is the number of items that are relevant to user u and which made it into the top k' items out of a total number N of items based on the recommender system's predictions, and $N_u^+$ denotes the number of items relevant to user u.

Precision and recall can both be calculated from complete data, i.e., if the ratings of all N items are known. Typically, however, most ratings are unobserved: in contrast to precision, recall can be estimated from MNAR data without bias under mild assumptions, as will be described below. Also, when comparing different recommender systems to each other on fixed data and fixed k', then precision and recall are proportional to each other, with a user-dependent proportionality factor $k'/N_u^+$. In other words, the recommender system with the larger recall also has the larger precision.

In place of the integer-valued k' as threshold of the top-k hit rate, we will use a normalized k∈[0,1] in the remainder of this description: k=(k'−1)/(N−1) determines the fraction of items relative to the total number N of items.

For the reasons outlined above, we define the top-k hit rate as recall (proportional to precision, for fixed data and k):

$$TOPK_u(k) = \frac{N_u^{+,k}}{N_u^+}, \quad (1)$$

where $N_u^+$ denotes all items relevant to user u, and $N_u^{+,k}$ counts the relevant ones in the top k, as above. Its maximum value (achieved for perfect recommendations) is $k'/N_u^+<1$ if $k'<N_u^+$, and equal to 1 otherwise. The average over all users u is given by $$TOPK(k) = \sum_u w^u TOPK_u(k), \quad (2)$$

with normalized user-weights $w^u$, $\Sigma_u w^u = 1$.

The following two properties of Eq. (1) may be considered a disadvantage: (1) it depends on the chosen value of k, and (2) it has a hard cut-off for the top k items, and ignores the ordering (position bias) of relevant items that are ranked either below or above the cut-off Both can be overcome by using an alternative measure, referred to herein as Area under the $TOPK_u$-curve ($ATOP_u$) for user u. We define it as follows:

$$ATOP_u = \int_0^1 TOPK_u(k)dk. \quad (3)$$

Given that $TOPK_u(k)$ is a monotone increasing function of k∈[0,1], we can alternatively consider k as a function of $TOPK_u$, and integrate along $TOPK_u$ instead: $ATOP_u = \int_0^1 (1-k)dTOPK_u$. From complete data, the latter can be calculated (as a non-parametric estimate) as follows: for fixed user u, all items i are ranked according to their predicted rating $\hat{R}_{u,i}$: item i with the highest predicted rating is assigned the largest rank $Rank_{u,i}=N$, and the item with the lowest predicted rating obtains $Rank_{u,i}=1$. Note that ranks may alternatively be defined such that the smallest rank-value is best. However, the above definition has the advantage that it can also be viewed from the perspective of the well-known Borda count technique.

We define the normalized rank $Nrank_{u,i}=(Rank_{u,i}-1)/(N-1)\in[0,1]$. Let $S_u^+$ denote the set of relevant items for user u. Then the non-parametric estimate of the $TOPK_u$-curve, based on these ranked items, increases by 1/N: where $Nrank_{u,i}^+ = 1-k$ for each $i \in S_u^+$, and is constant everywhere else. For this reason, we have:

$$ATOP_u = \frac{1}{N_u^+} \sum_{i \in S_u^+} Nrank_{u,i}^+ = \langle Nrank_{u,i}^+ \rangle_{i \in S_u^+}, \quad (4)$$

where <•> denotes the average. The area under the $TOPK_u$-curve equals the average normalized rank of the relevant items. Rather than the ordering of all items, often the ordering above a small cut-off value is of interest; it is straightforward to define a truncated version of ATOP that captures the area under the initial part of the TOPK curve only. With the same weights for the users as above, the average area under the $TOPK_u$-curves is defined as $$ATOP = \sum_u w^u ATOP_u. \quad (5)$$

We will now show that the performance measures outlined above, TOPK and ATOP, can be estimated from available MNAR data under mild assumptions. The motivation for our approach is as follows. In the one extreme, the ratings are indeed missing at random, and the missing data mechanism can be ignored. For a given data set, one cannot generally expect this convenient assumption to hold. In the other extreme, there is a non-trivial missing data mechanism, and one is able to model it exactly. Unfortunately, the exact missing data mechanism is typically unknown. Even if it were known for one particular data set, one could not expect it to be valid for other data sets in general. But there is also some middle ground between these two extremes, which is the focus of the present illustrative embodiments.

We make the following general assumptions. First, we assume that the relevant rating values are missing at random in the observed data. Second, concerning the other rating values, we allow for an arbitrary missing data mechanism, as long as they are missing with a higher probability than the relevant rating values.

Typically, the number of relevant ratings is only a tiny fraction (e.g., a few percent) of all ratings in the complete data. The first assumption above is hence a major relaxation compared to the assumption that all ratings are missing at random. Note, however, as every assumption is a simplification of the real world, it may not hold exactly for a given data set in reality; but it may serve as a reasonable approximation across a large number of data sets. This is supported by the large improvements we obtained in our experiments. The second assumption can be expected to hold for many data sets. Note that this also implies that the average unobserved rating is lower than the average observed rating.

Let $S_u^{+,obs}$ denote the set of observed relevant items for user u, and $N_u^{+,obs}=|S_u^{+,obs}|$ their number; let $N_u^{+,obs,k}$ be the number of relevant items in the top k. $\mathrm{Nrank}_{u,i}^{+,obs}$ is calculated for the observed relevant items with respect to all items.

Under the above two assumptions, the measures $$TOPK_u^{obs}(k) = \frac{N_u^{+,obs,k}}{N_u^{+,obs}}, \qquad (6)$$

$$ATOP_u^{obs} = <\mathrm{Nrank}_{u,i}^{+,obs}>_{i \in S_u^{+,obs}}, \qquad (7)$$

computed from the observed MNAR data, provide unbiased estimates of the measures $TOPK_u(k)$ and $ATOP_u$, respectively. The averages $TOPK^{obs}(k)=\Sigma_u w^u TOPK_u^{obs}(k)$ and $ATOP^{obs}=\Sigma_u w^u ATOP_u^{obs}$ are unbiased estimators of the corresponding measures evaluated on complete data.

The ranks of the observed relevant items are determined by using all the N items, whether their ratings are observed or missing. The ranks of the observed relevant items are identical for complete and MNAR data. With the assumption that the relevant items are missing at random, it is apparent that their average rank can be estimated without bias. The other features follow analogously from the first assumption above, and the well-known fact that estimates are unbiased from data missing at random.

In summary, $TOPK_u^{obs}(k)$ is (1) the unbiased estimate of recall (under the outlined assumptions); and (2) proportional to precision (with unknown user-dependent proportionality-factor $k'/N_u^+$) when comparing recommender systems on fixed data and fixed k. In other words, the recommender system with larger recall also has larger precision on fixed data and fixed k. Analogously, the weighted average over all users, $TOPK^{obs}(k)=\Sigma_u w^u TOPK_u^{obs}(k)$ is (1) an unbiased estimate of the average recall (weighted by $w^u$), and (2) proportional to the precision averaged over the users.

$ATOP_u^{obs}$ can be viewed (1) as the unbiased estimate of the area under the $TOPK_u(k)$-curve; and (2) as the average normalized rank of the relevant items. Both views also apply to the weighted average over the users, $ATOP^{obs}=\Sigma_u w^u ATOP_u^{obs}$. Note that ATOP captures position bias (within the entire list of items), but in a quantitatively different way than conventional measures such as nDCG, ERR, or MAP. Note that the latter measures cannot be readily evaluated in the presence of missing ratings.

Practical techniques for computation of the ATOP will now be described. First, our definition of the normalized rank, $\mathrm{Nrank}_{u,i}=(\mathrm{Rank}_{u,i}-1)/(N-1)\in[0,1]$ (above Eq. (4)), can also be viewed as follows: for a given user u and item i, it is the fraction of remaining items (i.e., all items except for item i) that are ranked lower than item i. One can thus calculate $\mathrm{Nrank}_{u,i}^+$ for each user-item pair (i,u) with an observed relevant rating in the test set individually; in other words, one can iterate through the list of relevant pairs (i,u) in the test set in any order and calculate the normalized rank $\mathrm{Nrank}_{u,i}^+$ for one pair (i,u) at a time. This may be more convenient than calculating the ranks of all relevant items simultaneously for each user u. The ATOP measure can then be calculated as the average of all these normalized ranks; and the TOPK(k) measure as the fraction of those normalized ranks with $\mathrm{Nrank}_{i,u} \geq 1-k$; note that this implicitly determines the weights $w^u$ over the users: $w^u \propto N_u^{+,obs}$, i.e., the number of observed relevant ratings of user u. These same weights are used in the experiments described below.

Second, one may rank a relevant pair (i,u) with respect to a random subsample of size $\tilde{N}-1$ of the remaining items (N-1). This results in computationally efficient estimation of the TOPK(k) and ATOP measures. Note that this may result in a small positive bias, especially for TOPK(k) at small values of k; it is hence important to use the same value of $\tilde{N}$ for fair comparisons (of course, bias-correction is an alternative).

Good performance of recommender systems with respect to the above-described TOPK and ATOP measures on a particular test set can only be expected when they have been trained on an appropriate objective function. Ideally, one would use the same objective function (plus some regularization) for training as is later used as a performance measure in testing. While the TOPK and ATOP measures are computationally tractable for testing, they are unfortunately computationally very expensive to optimize during training, like other rank-based measures. For this reason, we instead utilize in the present embodiments an appropriate surrogate measure for computationally efficient training. As motivated above, an important property is to consider the ranking of all items, whether their ratings are observed or missing in the data. This important property is captured by the illustrative AllRank objective function, three examples of which are presented below, all based on logistic regression for computational efficiency.

We initially note that the $ATOP^{obs}$-test-measure is the average rank of the observed relevant items with respect to all items. Thus, the learning task can be cast as a binary classification problem: the observed relevant items are assigned to class 1, and the other items (with lower or missing ratings) are assigned to class 0. In place of the rating matrix R, we use the corresponding binary matrix Y.

Our first exemplary objective function, AllRank-Binary-Logistic, uses the penalized log likelihood of logistic regression, $$\sum_{all\ u}\sum_{all\ i} W_{i,u}\left\{Y_{i,u}\hat{Y}_{i,u} - \log(1+e^{\hat{Y}_{i,u}}) - \frac{1}{2}\|\theta_{i,u}\|_2^2\right\}, \qquad (8)$$

where $\hat{Y}_{i,u} \in [0,1]$ denotes the prediction. The sum extends over all item-user pairs (i,u) (with observed and unobserved ratings). The weights $W_{i,u}$ take only two values for simplicity: $W_{i,u}=1$ for observed relevant ratings (class 1), and $W_{i,u}=w_m$ if the rating of pair (i,u) does not have a relevant value or if the rating is missing (class 0); $w_m$ is a tuning parameter in this objective function, besides the regularization factor $\lambda$ in the ridge penalty term involving the L2 norm of the model parameters $\theta_{i,u}$. These tuning parameters are determined by cross-validation as to optimize the $ATOP^{obs}$-measure on the test set. The objective function in Eq. (8) has two major drawbacks: (1) when cast as a classification problem, all the observed ratings, except for the relevant ones, are ignored, which may result in a considerable loss of information; (2) maximizing Eq. (8) is computationally inefficient for large data sets, e.g., using the Newton-Raphson algorithm.

Given the large training set size, computational efficiency of optimizing Eq. (8) can be increased by using quadratic approximations of the type described in N. Srebro et al., "Weighted low-rank approximations," International Conference on Machine Learning (ICML), pages 720-727, 2003. More specifically, a computationally efficient approach can be obtained by replacing Eq. (8) with least squares for the binary matrix Y, which results in our second objective function, AllRank-Binary-Regression:

$$\sum_{all\ u}\sum_{all\ i} W_{i,u}\{(Y_{i,u} - \hat{Y}_{i,u})^2 + \lambda\|\theta_{i,u}\|_2^2\}. \quad (9)$$

Finally, in our third objective function, AllRank-Regression, we use all observed rating values (i.e., not binarized), as this allows one to learn from gradual differences in the rating values. For all missing rating values, we impute the value $r_m$. This is the simplest approach to dealing with missing data; more importantly, though, this allows us to retain the sparsity of the original rating matrix, which is essential for efficient computations. We allow for a different weight-value for each rating value $R_{i,u}^{obs}$, and an additional weight $w_m$ for the missing ratings:

$$W_{i,u} = \begin{cases} w(R_{i,u}^{obs}) & \text{if } R_{i,u}^{obs} \text{ observed} \\ w_m & \text{otherwise,} \end{cases} \quad (10)$$

$$\sum_{all\ u}\sum_{all\ i} W_{i,u}\{(R_{i,u}^{o\&i} - \hat{R}_{i,u})^2 + \lambda\|\theta_{i,u}\|_2^2\}, \quad (11)$$

where $R_{i,u}^{o\&i}$ are the observed and imputed ratings, while $\hat{R}_{i,u}$ are the predicted ratings.

An exemplary model will now be described. In this embodiment, we take a collaborative filtering approach, and use a basic low-rank matrix-factorization model: the matrix of predicted ratings $\hat{R} \in R^{i_0 \times u_0}$, where $i_0 = N$ denotes the number of items, and $u_0$ the number of users, is modeled as $$\hat{R} = r_m + PQ^T, \quad (12)$$

with matrices $P \in R^{i_0 \times j_0}$ and $Q \in R^{u_0 \times j_0}$, where $j_0 \ll i_0, u_0$ is a free parameter of the model and determines the rank. Note that we choose the offset $r_m \in R$ in Eq. (12) to be equal to the imputed rating $r_m$. All entries in these matrices are considered independent parameters, with L2-norm for pair (i,u):

$$\|\theta_{i,u}\|_2^2 = \sum_{j=1}^{j_0} P_{i,j}^2 + Q_{u,j}^2.$$

We will now describe the manner in which the third objective function (see Eq. (11)) can be optimized efficiently for this model, using an alternating least squares approach. More specifically, we describe the update equations for learning P and Q for fixed tuning parameters $W_{i,u}, r_m$, and $\lambda$. Additionally, the tuning parameters have to be optimized via cross validation so as to maximize ATOP$^{obs}$ on the test data.

Determining the values in the two matrices P and Q by minimizing Eq (11) is a non-convex minimization problem. Alternating least squares is an elegant and efficient method for finding a near-minimum solution of Eq. (11) by gradient descent. It can also be used for incremental updates as new rating values arrive over time. At each step of this procedure, one of the two matrices P and Q is assumed fixed, which turns the update of the other one into a quadratic optimization problem that can be solved exactly.

For fixed Q, the matrix P that minimizes Eq. (11) can be calculated using the usual necessary condition (equate gradient to zero), and solving for $P_i$ for each item i. This results in the following update equation for each row i of P:

$$P_{i,\cdot} = (R_{i,\cdot}^{o\&i} - r_m)\tilde{W}^{(i)}Q(Q^T\tilde{W}^{(i)}Q + \lambda tr(\tilde{W}^{(i)})I)^{-1}, \quad (13)$$

where the dot in the index of a matrix refers to the vector of all entries; $\tilde{W}^{(i)} = \text{diag}(W_{i,\cdot}) \in R^{u_0 \times u_0}$ is the diagonal matrix containing the $i^{th}$ row of weight matrix W; $I \in R^{j_0 \times j_0}$ is the identity matrix. While the diagonal matrix $\tilde{W}^{(i)}$ may appear to be of computationally prohibitive size, Eq. (13) can be computed efficiently, as will be described below.

Analogously, the update equation for each row u of Q is:

$$Q_{u,\cdot} = (R_{\cdot,u}^{o\&i^T} - r_m)\tilde{W}^{(u)}P(P^T\tilde{W}^{(u)}P + \lambda tr(\tilde{W}^{(u)})\cdot I)^{-1}, \quad (14)$$

where $\tilde{W}^{(u)} = \text{diag}(W_{\cdot,u}) \in R^{i_0 \times i_0}$ is the diagonal matrix containing the $u^{th}$ column of the weight matrix W. The common random initialization is used to generate the matrices P, Q of expected maximal rank $j_0$ at the beginning.

As will now be described, update equation Eq. (13) (and Eq. (14) analogously) can be rewritten in a way that makes them computationally efficient. In practice, the resulting computations are only slightly more costly compared to the conventional objective of optimizing RMSE on the observed ratings only.

First, because $R_{i,u}^{o\&i} - r_m = 0$ if the rating of pair (i,u) is unobserved, we have $$(R_{i,\cdot}^{o\&i} - r_m)\tilde{W}^{(i)}Q = (R_{i,u \in S_i}^{o\&i} - r_m)((W_{i,u \in S_i}11(1,j_0)) \otimes Q_{u \in S_i,\cdot}), \quad (15)$$

where $11(1,j_0) \in R^{1 \times j_0}$ is a vector of ones, and $\otimes$ denotes the elementwise product of matrices. Note that this expression involves only the submatrices for the set of users u who have rated item i, denoted by $S_i$. This is typically a very small subset of all users.

Second, because $W_{i,u} - w_m = 0$ if the rating of pair (i,u) is missing, one can decompose:

$$Q^T\tilde{W}^{(i)}Q = w_m Q^T Q - w_m Q_{u \in S_i,\cdot}^T + (Q_{u \in S_i,\cdot}^T \otimes (11(j_0,1)W_{i,u \in S_i}))Q_{u \in S_i,\cdot} \quad (16)$$

Note that the first and computationally most expensive term can be pre-computed at each step for all u, while the other two terms require only a submatrix of Q concerning the users u who have rated item i.

Third, the trace simplifies into a sum over the users u who have rated item i (rather than summing over all users):

$$tr(\tilde{W}^{(i)}) = w_m u_0 + \sum_{u \in S_i}(w_{i,u} - w_m). \quad (17)$$

It should be noted that there are applications where multiple ratings are associated with a user-item pair. This situation occurs, for instance, when users rated songs, while the task is to recommend artists or albums, which are aggregates of songs. There are also other applications where multiple ratings may occur, e.g., where users provide repeated feedback over time concerning TV shows. While they can all be treated the same way mathematically (as shown below), the album/songs example may be the easiest one to understand intuitively, and is used as a running example in the following.

We can train a matrix factorization model to make recommendations for aggregates (e.g., albums) as follows: let the index i now refer to the aggregates. Then all the above description for the single rating case carries over, except that we need an additional index s over the different songs associated with an album (i.e., s is the index over the songs in an album, where each song can possibly have obtained a rating from user u). Then the training objective function (Eq. 13) above becomes:

$$\sum_{all\ u}\sum_{all\ i}\sum_{s} W_{i,u,s}\{(R_{i,u,s}^{o\&i} - \hat{R}_{i,u})^2 + \lambda\|\theta_{i,u}\|_2^2\}, \quad (18)$$

It can be seen that optimizing this objective function is equivalent to optimizing the following objective function:

$$\sum_{all\ u}\sum_{all\ i} W_{i,u}\{(\overline{R}_{i,u} - \hat{R}_{i,u})^2 + \lambda\|\theta_{i,u}\|_2^2\}, \quad (19)$$

where $$W_{i,u} = \sum_{s} W_{i,u,s} \quad (20)$$

and $$\overline{R}_{i,u} = \frac{\sum_{s} W_{i,u,s} R_{i,u,s}^{o\&i}}{W_{i,u}}. \quad (21)$$

This means that the weights are added; and the weighted average is taken concerning the ratings. Eq. (19) is an optimization problem which has at most one value for each pair (i,u), namely the value $\overline{R}_{i,u}$. This problem can hence be solved in the same manner described above for the single rating case.

In summary, Eqs. (20) and (21) show how to transform a case with possibly multiple ratings for each pair (i,u) into an equivalent one with at most one rating value, which we know how to solve. Eqs. (20) and (21) further show that multiple or repeated ratings have the effect of increasing the weight for the aggregate (while the ratings are averaged). This shows that the weights also carry information on the preferences of users, not only the ratings.

As indicated above, experiments were performed using certain of the illustrative embodiments described above. The experiments were performed on publicly available ratings data, namely, the MovieLens and Netflix data sets. The MovieLens data, available from GroupLens Research, www.grouplens.org/node/73, involves 3,900 movies and 6,040 users, and ratings are available for about 1 million movie-user pairs. About 4% of all possible ratings are observed in this data set, and the ratings take integer values from 1 (worst) to 5 (best). The Netflix Prize data set contains 17,770 movies and almost half a million users. About 100 million ratings are available. Ratings are observed for about 1% of all possible movie-user pairs. The ratings take integer values from 1 (worst) to 5 (best). See J. Bennet et al., "The Netflix Prize," Workshop at SIGKDD-07, ACM Conference on Knowledge Discovery and Data Mining, 2007. For all experiments, we chose rank $j_0$=50 of the above-described low-rank matrix factorization model (Eq. (12)). We considered 5-star ratings as relevant to a user, and used the top-k hit rate, TOPK, and the area under the top-k hit rate curve, ATOP, as outlined above, as our performance measures on the test data. It was found that the illustrative embodiments provided approximately 40-50% higher top-k hit rates (depending on the chosen value for k), than conventional approaches that simply ignore missing ratings. This significantly improved performance in terms of higher top-k hit rates can translate to higher sales of selectable items in electronic commerce and other applications.

As indicated previously, embodiments of the present invention may be implemented at least in part in the form of one or more software programs that are stored in a memory or other computer-readable medium of a processing device of an information processing system. System components such as the modules 120, 122 and 124 may be implemented at least in part using software programs. Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), ASICs, digital signal processors or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types and arrangements of system components depending on the needs of the particular recommender system application. Alternative embodiments may therefore utilize the techniques described herein in other contexts in which it is desirable to implement accurate and efficient recommendations for selectable items. Also, it should also be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method for use in a recommender system, the method comprising:
   obtaining observed feedback data;
   constructing a model that accounts for both the observed feedback data and additional feedback data that is missing from the observed feedback data;
   optimizing one or more parameters of the model using a training objective function; and
   generating a list of recommended items for a given user based on the optimized model;
   wherein the constructing step comprises:
      determining whether each of a plurality of item-user pairs are associated with at least one of the observed feedback data and the additional feedback data that is missing from the observed feedback data; and
      responsive to said determining, assigning the plurality of item-user pairs to respective ones of a plurality of different classes;
   wherein the training objective function utilizes weights associated with respective ones of the item-user pairs, the weights assigned to the item-user pairs being based at least in part on the classes of the item-user pairs;
   wherein the training objective function comprises at least one of:
      a penalized log likelihood logistic regression using the weights for item-user pairs, the weights being binary weights;
      a least squares regression using the weights for item-user pairs, the weights being binary weights;
      a regression using the weights for item-user pairs, the regression being based at least in part on a comparison of observed or imputed ratings to predicted ratings for one or more item-user pairs; and
      a regression using the weights for item-user pairs, the regression being based at least in part on a given item-user pair having two or more observed or imputed ratings; and wherein the obtaining, constructing, optimizing and generating steps are implemented in a processing device comprising a processor coupled to a memory.

2. The method of claim 1 wherein the missing feedback data comprises data that is missing not at random (MNAR).

3. The method of claim 1 wherein the observed feedback data comprises explicit feedback data including ratings assigned to selectable items by users.

4. The method of claim 1 wherein the model comprises a matrix factorization model.

5. The method of claim 4 wherein the matrix factorization model is characterized as a neural network.

6. The method of claim 1 wherein the training objective function is given by:

$$\sum_{all\ u} \sum_{all\ i} W_{i,u} \left\{ Y_{i,u} \hat{Y}_{i,u} - \log(1 + e^{\hat{Y}_{i,u}}) - \frac{1}{2}\|\theta_{i,u}\|_2^2 \right\},$$

where i is an item index, u is a user index, $W_{i,u}$ are the weights, $Y_{i,u}$ are binary matrix entries, $\hat{Y}_{i,u}$ are predicted binary matrix entries, and $\theta_{i,u}$ are model parameters.

7. The method of claim 1 wherein the training objective function is given by:

$$\sum_{all\ u} \sum_{all\ i} W_{i,u} \left\{ (Y_{i,u} - \hat{Y}_{i,u})^2 + \lambda\|\theta_{i,u}\|_2^2 \right\}$$

where i is an item index, u is a user index, $W_{i,u}$ are the weights, $Y_{i,u}$ are binary matrix entries, $\hat{Y}_{i,u}$ are predicted binary matrix entries, and $\lambda$ and $\theta_{i,u}$ are model parameters.

8. The method of claim 1 wherein the training objective function is given by:

$$\sum_{all\ u} \sum_{all\ i} W_{i,u} \left\{ (R_{i,u}^{o\&i} - \hat{R}_{i,u})^2 + \lambda\|\theta_{i,u}\|_2^2 \right\},$$

where i is an item index, u is a user index, $W_{i,u}$ are the weights, $R_{i,u}^{o\&i}$ are the observed and imputed ratings, $\hat{R}_{i,u}$ are the predicted ratings, and $\lambda$ and $\theta_{i,u}$ are model parameters.

9. The method of claim 8 wherein the weights $W_{i,u}$ are determined in the following manner:

$$W_{i,u} = \begin{cases} w(R_{i,u}^{obs}) & \text{if } R_{i,u}^{obs} \text{ observed} \\ w_m & \text{otherwise,} \end{cases}$$

where $w_m$ denotes an additional weight utilized for missing ratings.

10. The method of claim 1 wherein the training objective function is given by:

$$\sum_{all\ u} \sum_{all\ i} W_{i,u} \left\{ (\overline{R}_{i,u} - \hat{R}_{i,u})^2 + \lambda\|\theta_{i,u}\|_2^2 \right\},$$

where $$W_{i,u} = \sum_s W_{i,u,s}$$

and $$\overline{R}_{i,u} = \frac{\sum_s W_{i,u,s} R_{i,u,s}^{o\&i}}{W_{i,u}},$$

and where i is an aggregate item index, s is an index of ratable sub-items within aggregate item i, u is a user index, $W_{i,u}$ and $W_{i,u,s}$ are the weights, $R_{i,u,s}^{o\&i}$ are the observed and imputed ratings, $\hat{R}_{i,u}$ are predicted ratings, and $\lambda$ and $\theta_{i,u}$ are model parameters.

11. An article of manufacture comprising a non-transitory computer-readable storage medium having embodied therein executable program code that when executed by a processor of a processing device causes the device to perform the steps of the method of claim 1.

12. An apparatus comprising:
a processing device comprising a processor having an associated memory;
wherein the processing device is operative:
to obtain observed feedback data;
to construct a model that accounts for both the observed feedback data and additional feedback data that is missing from the observed feedback data;
to optimize one or more parameters of the model using a training objective function; and
to generate a list of recommended items for a given user based on the optimized model;
wherein constructing the model comprises:
determining whether each of a plurality of item-user pairs are associated with at least one of the observed feedback data and the additional feedback data that is missing from the observed feedback data; and
responsive to said determining, assigning the plurality of item-user pairs to respective ones of a plurality of different classes; and
wherein the training objective function utilizes weights associated with respective ones of the item-user pairs, the weights assigned to the item-user pairs being based at least in part on the classes of the item-user pairs; and
wherein the training objective function comprises at least one of:
a penalized log likelihood logistic regression using the weights for item-user pairs, the weights being binary weights;
a least squares regression using the weights for item-user pairs, the weights being binary weights;
a regression using the weights for item-user pairs, the regression being based at least in part on a comparison of observed or imputed ratings to predicted ratings for one or more item-user pairs; and
a regression using the weights for item-user pairs, the regression being based at least in part on a given item-user pair having two or more observed or imputed ratings.

13. The apparatus of claim 12 wherein the processing device comprises a server.

14. The apparatus of claim 12 wherein the server comprises a back end server of a web-based information processing system.

15. The apparatus of claim 12 wherein the processing device implements a recommender system comprising a recommendation module and a training module.

16. The apparatus of claim 12 wherein the apparatus is comprised in an integrated circuit.

17. A recommender system comprising:
a training module; and
a recommendation module coupled to the training module;
wherein the training module is configured to apply a training objective function to optimize one or more parameters of a model that accounts for both observed feedback data and additional feedback data that is missing from the observed feedback data;
wherein the recommendation module generates a list of recommended items for a given user based on the optimized model;
wherein the model is constructed at least in part by:
  determining whether each of a plurality of item-user pairs are associated with at least one of the observed feedback data and the additional feedback data that is missing from the observed feedback data; and
  responsive to said determining, assigning the plurality of item-user pairs to respective ones of a plurality of different classes;
wherein the training objective function utilizes weights associated with respective ones of the item-user pairs, the weights assigned to the item-user pairs being based at least in part on the classes of the item-user pairs;
wherein the training objective function comprises at least one of:
  a penalized log likelihood logistic regression using the weights for item-user pairs, the weights being binary weights;
  a least squares regression using the weights for item-user pairs, the weights being binary weights;
  a regression using the weights for item-user pairs, the regression being based at least in part on a comparison of observed or imputed ratings to predicted ratings for one or more item-user pairs; and
  a regression using the weights for item-user pairs, the regression being based at least in part on a given item-user pair having two or more observed or imputed ratings; and
wherein the recommender system is implemented using at least one processor device.

18. The system of claim 17 wherein the missing feedback data comprises data that is missing not at random (MNAR).

19. The system of claim 17 wherein the observed feedback data comprises explicit feedback data including ratings assigned to selectable items by users.

20. The system of claim 17 wherein the model comprises a matrix factorization model.

21. The method of claim 1 wherein the training objective function comprises the penalized log likelihood logistic regression using the weights for item-user pairs, the weights being binary weights.

22. The method of claim 1 wherein the training objective function comprises the least squares regression using the weights for item-user pairs, the weights being binary weights.

23. The method of claim 1 wherein the training objective function comprises the regression using the weights for item-user pairs, the regression being based at least in part on the comparison of observed or imputed ratings to predicted ratings for one or more item-user pairs.

24. The method of claim 1 wherein the training objective function comprises the regression using the weights for item-user pairs, the regression being based at least in part on the given item-user pair having two or more observed or imputed ratings.

* * * * *

UNITED STATES PATENT AND TRADEMARK OFFICE
CERTIFICATE OF CORRECTION

PATENT NO.         : 9,092,739 B2
APPLICATION NO.    : 12/841720
DATED              : July 28, 2015
INVENTOR(S)        : Harald Steck Page 1 of 2

It is certified that error appears in the above-identified patent and that said Letters Patent is hereby corrected as shown below:

In the specification:

Column 5, line 12, please change " $k' \epsilon N$ " to -- $k' \in \mathbb{N}$ --

Column 6, line 11, please change "1/N" to -- $1/N_u^+$ --

Column 9, line 33, please change " $\hat{R} \epsilon R^{i_0 \times u_0}$ " to -- $\hat{R} \in \mathbb{R}^{i_0 \times u_0}$ --

Column 9, line 33, please change " $P \epsilon R^{i_0 \times j_0}$ " to -- $P \in \mathbb{R}^{i_0 \times j_0}$ --

Column 9, line 33, please change " $Q \epsilon R^{u_0 \times j_0}$ " to -- $Q \in \mathbb{R}^{u_0 \times j_0}$ --

Column 9, line 35, please change "$r_m \epsilon R$" to -- $r_m \in \mathbb{R}$ --

Column 9, line 67, please change " $\tilde{W}^{(i)} = \text{diag}(W_{i,.}) \epsilon R^{u_0 \times u_0}$ " to -- $\tilde{W}^{(i)} = diag(W_{i,.}) \in \mathbb{R}^{u_0 \times u_0}$ --

Column 10, line 1, please change " $I \epsilon R^{j_0 \times j_0}$ " to -- $I \in \mathbb{R}^{j_0 \times j_0}$ --

Column 10, lines 45-35, please change

" $Q^T \tilde{W}^{(i)} Q = w_m Q^T Q - w_m Q_{u \in S_{j,.}} + (Q_{u \in S_{j,.}}^T \mathbb{R} (11(j_0, 1) W_{i, u \in S_j})) Q_{u \in S_{j,.}}$ " to Signed and Sealed this
Twelfth Day of January, 2016

Michelle K. Lee
*Director of the United States Patent and Trademark Office*

$$Q^T \tilde{W}^{(l)} Q$$
$$= w_m Q^T Q - w_m Q^T_{u \in S_j,\cdot} Q_{u \in S_j,\cdot}$$
$$+ \left( Q^T_{u \in S_j,\cdot} \otimes \left( \mathbb{1}(j_0, 1) W_{i, u \in S_j} \right) \right) Q_{u \in S_j,\cdot}$$

In the claims:

Claim 10, column 13, line 56, before "training" please delete ","

Claim 12, column 14, line 38, after "different classes;" please delete "and"